United States Patent [19]

Taniguchi et al.

[11] Patent Number: 5,204,766

[45] Date of Patent: Apr. 20, 1993

[54] FERROELECTRIC LIQUID CRYSTAL CELL WITH PARTICULATE ADHESIVE DENSITY HIGHER NEAR SIDE

[75] Inventors: Osamu Taniguchi, Chigasaki; Shinjiro Okada, Isehara; Hironobu Mizuno, Hiratsuka; Yutaka Inaba, Kawaguchi, all of Japan

[73] Assignee: Canon Kabushiki Kaisha, Tokyo, Japan

[21] Appl. No.: 858,338

[22] Filed: Mar. 26, 1992

[30] Foreign Application Priority Data

Mar. 28, 1991 [JP] Japan .................... 3-087365

[51] Int. Cl.$^5$ ................ G02F 1/1339; G02F 1/1333; G02F 1/1337; G02F 1/13
[52] U.S. Cl. ...................... 359/81; 359/83; 359/100; 359/78
[58] Field of Search .............. 351/80, 81, 82, 83, 351/100, 75, 76, 78

[56] References Cited

U.S. PATENT DOCUMENTS

| | | | |
|---|---|---|---|
| 4,639,089 | 1/1987 | Okada et al. | 359/76 |
| 4,681,404 | 7/1987 | Okada et al. | 359/56 |
| 4,682,858 | 7/1987 | Kanbe et al. | 359/56 |
| 4,709,994 | 12/1987 | Kanbe et al. | 359/63 |
| 4,712,873 | 12/1987 | Kanbe et al. | 359/56 |
| 4,712,874 | 12/1987 | Sekimura et al. | 359/68 |
| 4,712,875 | 12/1987 | Tsuboyama et al. | 359/76 |
| 4,721,367 | 1/1988 | Yoshinaga et al. | 359/56 |
| 4,728,176 | 3/1988 | Tsuboyama et al. | 359/79 |
| 4,732,961 | 3/1988 | Oka | 528/87 |
| 4,740,060 | 4/1988 | Komura et al. | 359/75 |
| 4,744,639 | 5/1988 | Tsuboyama | 359/54 |
| 4,763,992 | 8/1988 | Takada et al. | 359/86 |
| 4,773,738 | 9/1988 | Hayakawa et al. | 359/56 |
| 4,776,676 | 10/1988 | Inoue et al. | 359/56 |
| 4,796,979 | 1/1989 | Tsuboyama | 359/77 |
| 4,800,382 | 1/1989 | Okada et al. | 340/784 |
| 4,802,740 | 2/1989 | Hotta et al. | 359/76 |
| 4,820,026 | 4/1989 | Okada et al. | 359/78 |
| 4,836,656 | 6/1989 | Mouri et al. | 359/56 |
| 4,844,590 | 7/1989 | Okada et al. | 359/56 |
| 4,869,577 | 9/1989 | Masaki | 359/76 |
| 4,878,740 | 11/1989 | Inaba et al. | 359/63 |
| 4,879,059 | 11/1989 | Hanyu et al. | 252/299 |
| 4,902,107 | 2/1990 | Tsuboyama et al. | 359/43 |
| 4,907,859 | 3/1990 | Takada et al. | 359/56 |
| 4,932,758 | 6/1990 | Hanyu et al. | 359/100 |
| 4,989,955 | 2/1991 | Ito et al. | 359/81 |
| 5,054,890 | 10/1991 | Hanyu et al. | 359/80 |
| 5,078,475 | 1/1992 | Sekimura et al. | 359/68 |
| 5,103,331 | 4/1992 | Taniguchi et al. | 359/81 |

FOREIGN PATENT DOCUMENTS

| | | |
|---|---|---|
| .0216632 | 4/1987 | European Pat. Off. . |
| 0219242 | 4/1987 | European Pat. Off. . |
| 0134626 | 6/1987 | Japan . |

*Primary Examiner*—William L. Sikes
*Assistant Examiner*—Kenneth Parker
*Attorney, Agent, or Firm*—Fitzpatrick, Cella, Harper & Scinto

[57] ABSTRACT

A liquid crystal cell is constituted a pair of substrates each having an electrode thereon and disposed with their faces having the electrode opposite to each other, a spacer and a particulate adhesive disposed to leave a spacing between the substrates, and a liquid crystal disposed to fill the spacing between the substrates. The particulate adhesive is dispersed at a higher density in a region close to a side of the cell than in a central region of the cell, particularly in a direction of unidirectional alignment axis provided to the substrates. By such uneven distribution of the particulate adhesive, undesirable local thickening of the cell side due to movement of liquid crystal molecules during drive can be suppressed.

6 Claims, 7 Drawing Sheets

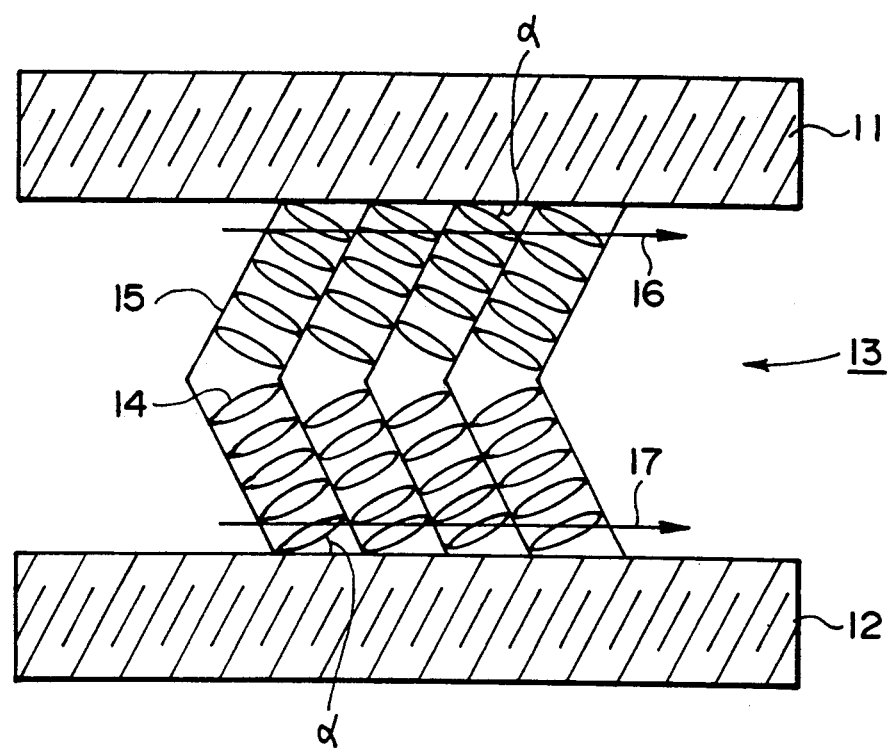
F I G. 1

FERROELECTRIC LIQUID CRYSTAL CELL WITH PARTICULATE ADHESIVE DENSITY HIGHER NEAR SIDE

FIELD OF THE INVENTION AND RELATED ART

The present invention relates to a cell structure of a liquid crystal cell, more particularly a cell structure suitable for a ferroelectric liquid crystal (hereinafter sometime abbreviated as "FLC").

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107216/1981, U.S. Pat. No. 4,367,924). The ferroelectric liquid crystal has generally chiral smectic C phase (SmC*) or H phase (SmH*) of a non-helical structure and, under this state, shows a property of taking either one of a first optically stable state and a second optically stable state responding to an electrical field applied thereto and maintaining such a state in the absence of an electrical field, namely bistability, and also has a rapid response to the change in electrical field. Thus, it is expected to be utilized in a high speed and memory type display device and particularly to provide a large-area, high resolution display.

Examples of such chiral smectic liquid crystal devices have been disclosed in, e.g., U.S. Pat. Nos. 4,639,089, 4,681,404, 4,682,858, 4,709,994, 4,712,872, 4,712,873, 4,712,874, 4,712,875, 4,721,367, 4,728,176, 4,720,060, 4,744,639, 4,747,671, 4,763,992, 4,773,738, 4,776,676, 4,778,259, 4,783,148, 4,796,979, 4,800,382, 4,802,740, 4,818,075, 4,818,078, 4,820,026, 4,836,656, 4,844,590, 4,869,577, 4,878,740, 4,879,059, 4,898,456, 4,907,859, 4,917,471, 4,932,757, 4,932,758, 5,000,545, 5,007,716, 5,013,137, 5,026,144, 5,054,890 and 5,078,475.

A liquid crystal cell having a layer structure as in chiral smectic phase has been reported to be accompanied with a defect that the layer structure is liable to be disordered due to a mechanical strain or impact applied to the cell, thus resulting in alignment failure. In order to obviate the defect, it has been proposed to disperse, e.g., an epoxy-type particulate adhesive between the substrates for bonding the substrates so as to suppress the change in spacing between the substrates in response to an external stress (EP-A 216632 and EP-A 219242). We have also confirmed the effectiveness of such a measure for suppressing the occurrence of alignment failure due to application of an external stress.

As another problem, however, when such a ferroelectric liquid crystal cell is continually driven to display a display pattern for a long period of time, there has been observed an increase in cell thickness, resulting in a certain color, near a side of the cell provided with a sealant.

SUMMARY OF THE INVENTION

An object of the present invention is to provide a liquid crystal cell, particularly a ferroelectric liquid crystal cell, having suppressed an increase in cell thickness near a cell side in the type of liquid crystal cells having an increased durability through the use of a particulate adhesive.

For prevention of the coloring due to an increase in cell thickness, we have found it effective to disperse the particulate adhesive not uniformly over the entire cell area of a liquid crystal cell but in a prescribed larger density in the region along the cell side where the increase in cell thickness occurs. More specifically, according to the present invention, there is provided a liquid crystal cell, comprising: a pair of substrates each having an electrode thereon and disposed with their faces having the electrode opposite to each other, a spacer and a particulate adhesive disposed to leave a spacing between the substrates, and a liquid crystal disposed to fill the spacing between the substrates, wherein the particulate adhesive is dispersed at a higher density in a region close to a side of the cell than (preferable as large as two-times that) in a central region of the cell, preferably in a direction generally perpendicular to the direction of the unidirectional alignment axes provided to the substrates.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a sectional view showing an alignment state of liquid crystal used in the present invention.

DESCRIPTION OF THE PREFERRED EMBODIMENTS

Figure 2:
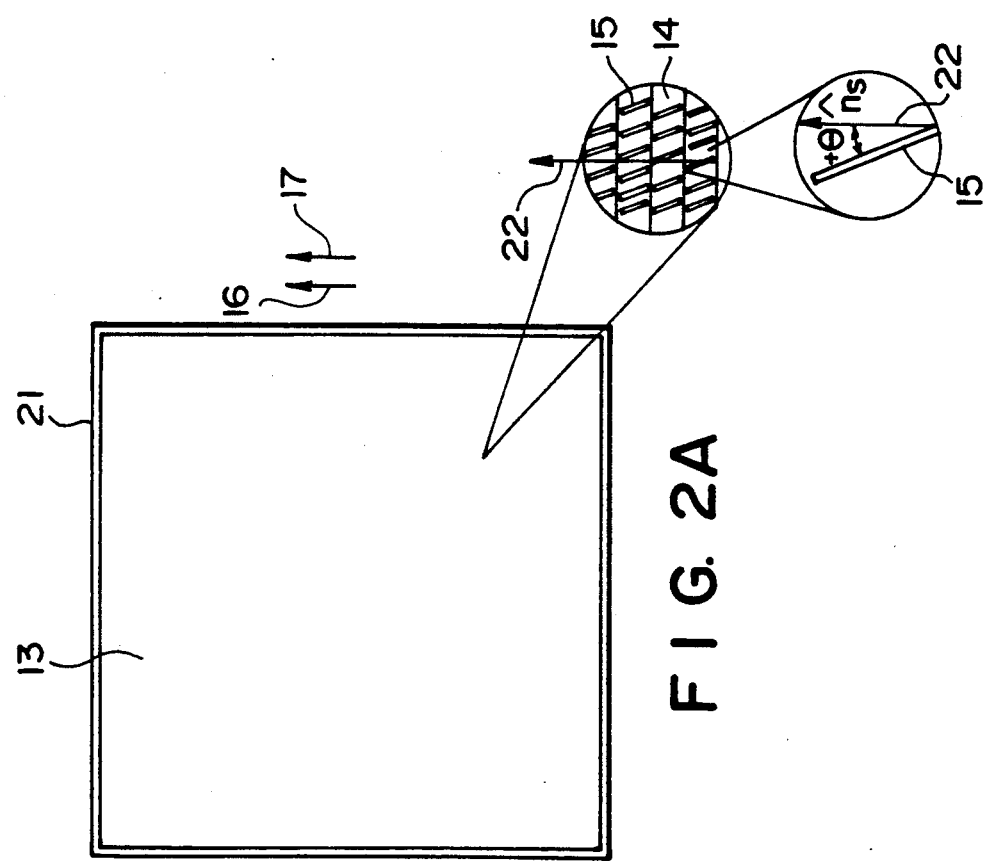
FIG. 2A shows a plan view corresponding to FIG. 1.
FIG. 2B is a partially enlarged view of FIG. 2A.
FIG. 2C is a partially enlarged view of FIG. 2B.

A device containing FLC molecules in an alignment state providing a chevron structure as shown in FIG. 1 has been known to provide an excellent bright state and thus a sufficiently large contrast when combined with crossed nicol polarizers. More specifically, FIG. 1 is a sectional view showing an alignment state of FLC 13 disposed between substrates 11 and 12. The FLC 13 forms a plurality of layers 15 each comprising plural liquid crystal molecules 14. The layers 15 are aligned substantially in a direction and each layer 15 is bent between the substrates. The long axis of each liquid crystal molecule 14 may preferably be inclined to form a pretilt angle $\alpha$ of at least 5 degrees with respect to the substrates 11 and 12. The above-mentioned alignment state may preferably be formed by providing unidirectional alignment axes 16 and 17, which are parallel and in the same direction, e.g., by rubbing, to the substrates 11 and 12.

FIG. 2 (including FIGS. 2A-2C) is a plan view of a device in which FLC 13 assumes a chevron structure as described with reference to FIG. 1. The device in FIG. 2 is constituted by fixing the substrates 11 and 12 having unidirectional rubbing axes 16 and 17, respectively, to each other by means of a sealant 21 to leave a space which is filled with FLC 13. In the device, the substrate 11 is provided with a first group of plural stripe electrodes for voltage application (not shown), and the substrate 12 is provided with a second group of plural stripe electrodes (not shown) intersecting the first group of stripe electrodes, thus forming an electrode matrix. The normal 22 with a vector $n_s$ to the layers 14 of FLC 13 (more exactly the projection of the normal 22 onto the substrates) is substantially parallel to the rubbing directions 16 and 17 as shown in FIG. 2B. The liquid crystal molecules 15 in the device shown in FIG. 2 (FIGS. 2B and 2C) are 1 uniformly oriented leftwards at a tilt angle $+\theta$ with their spontaneous polarization directing from the front face to the back face of the drawing.

Figure 3:
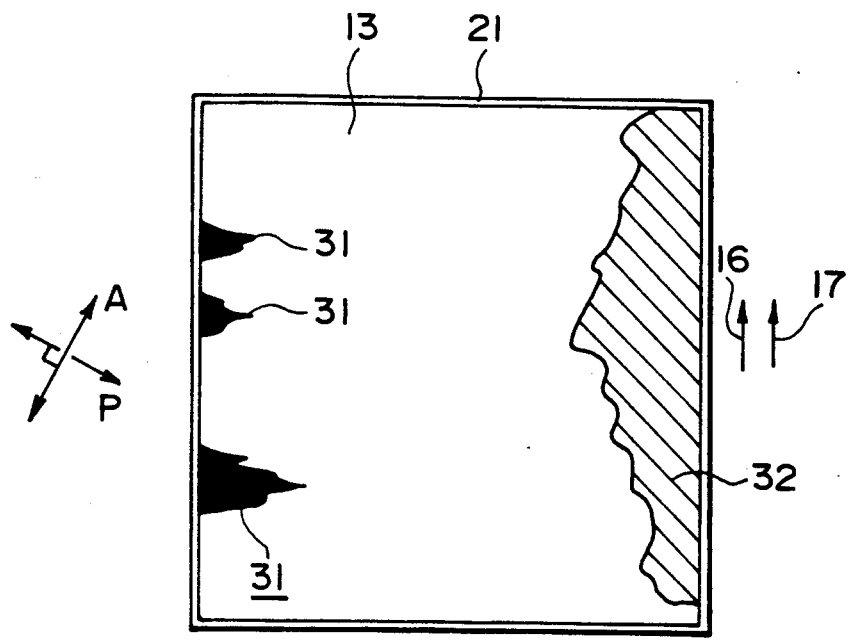
FIG. 3 is a plan view showing an alignment state in a conventional device.

According to our experiments, when the FLC in this state was supplied with a voltage (e.g., an AC voltage of $\pm 8$ volts and 10 Hz) applied between the opposite electrodes, a phenomenon was observed that the liquid crystal molecules 15 started flow rightwards to result in regions 31 with less or lacking liquid crystal molecules 15 on the left side and a region 32 with more liquid crystal molecules 15, when the voltage application was continued for a long period (e.g., 20-50 hours), as shown in FIG. 3 where P denotes the optical axis of a polarizer and A denotes the optical axis of an analyzer arranged in cross nicols. As a result, an interference color was observed over the extension of the device to impair the display quality.

In case where the liquid crystal molecules 15 in FIG. 2B were uniformly oriented rightwards at a tilt angle $-\theta 0$ with Their spontaneous polarization directing from the back face to the front face of the drawing, the liquid crystal molecules 15 were found to move leftwards in contrast to the above.

Figures 4A, 4B:
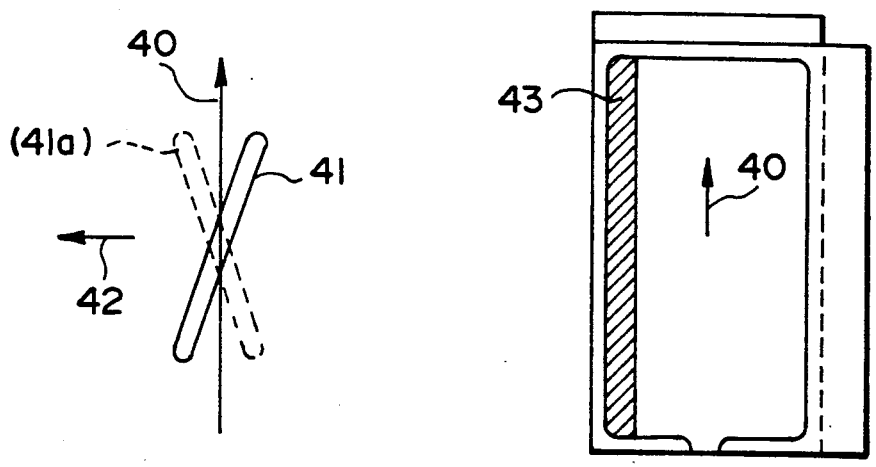
FIGS. 4A and 4B are views for illustrating the direction of a liquid crystal movement relative to a unidirectional alignment axis.

As the moving direction of liquid crystal molecules in related with the rubbing direction, the above-mentioned phenomenon is assumed to depend on the pre-tilt state at the substrate surfaces. FIGS. 4A and 4B are presented further for illustrating the relationship. Referring to FIGS. 4A and 4B, reference numeral 41 (or 41a in a reverse orientation state) denotes an average molecular axis (director) orientation. When the liquid crystal molecules (described herein as having a negative spontaneous polarization) are oriented to provide the average molecular axis 41 and are supplied with a certain strength of AC electric field not causing a switching to the orientation state 41a, the liquid crystal molecules are liable to move in the direction of an arrow 42 in the case where the substrates are provided with rubbing axes extending in parallel and in the same direction 40, thus resulting in a region 42 of richer liquid crystal molecules.

Further, it has been found that the abovementioned phenomenon of liquid crystal movement depends on an alignment state in a cell. More specifically, the phenomenon hardly occurs in a C2 alignment state described hereinafter but is liable to noticeably occur in a C1 and uniform alignment state.

Figure 5:
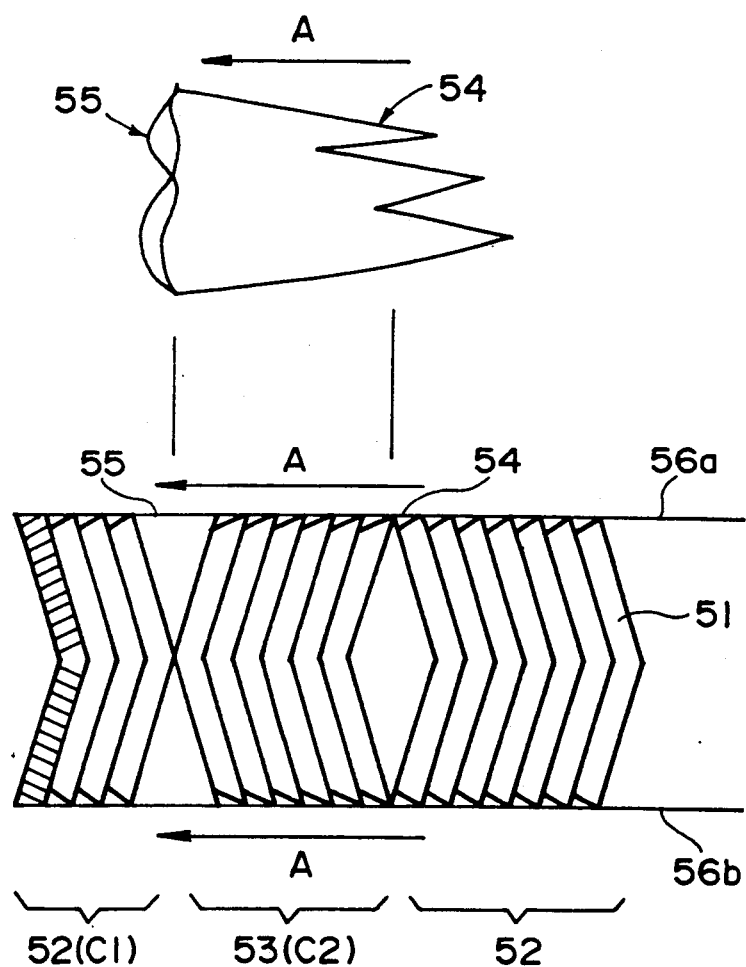
FIG. 5 is an explanatory view for illustrating a layer structure in C1 alignment and C2 alignment.

The two types of alignment states C1 and C2 have been explained based on a difference in chevron structure of smectic layers as shown in FIG. 5. Referring to FIG. 5, reference numeral 51 denotes a smectic layer showing ferroelectricity, 52 denotes a C1 alignment region, and 53 denotes a C2 alignment region. A smectic liquid crystal generally has a layer structure and causes a shrinkage of layer pitch when it is transformed from SmA (smectic A) phase into SmC (smectic C) phase or SmC* (chiral smectic C) phase, to result in a structure accompanied with a bending of layers between the substrates (chevron structure) as shown in FIG. 5. The bending of the layers can be caused in two ways corresponding to the C1 and C2 alignment as shown. As is well known, liquid crystal molecules at the substrate surfaces are aligned to form a certain angle (pre-tilt) as a result of rubbing in such a manner that their heads (leading ends) in the rubbing directions are up or away from the substrate surfaces. Because of the pre-tilt, the C1 and C2 alignment states are not equivalent to each other with respect to their elastic energy, and a transition between these states can be caused at a certain temperature or when supplied with a mechanical stress. When the layer structure shown in FIG. 5 is viewed in plan as shown in the upper part of FIG. 5, a boundary 54 of transition from C1 alignment (52) to C2 alignment (53) in the rubbing direction A looks like a zigzag lightning and is called a lightning defect, and a boundary 55 of transition from C2 alignment (53) to C1 alignment (52) forms a broad and moderate curve and is called a hairpin defect.

When FLC is disposed between a pair of substrates 56a and 56b and placed in an alignment state satisfying a relationship of $$\theta < \alpha + \delta \tag{1}$$

wherein $\alpha$ denotes a pretilt angle of the FLC, $\theta$ denotes a tilt angle (a half of cone angle), and $\delta$ denotes an angle of inclination of SmC* layer, it has been confirmed that there are four states each having a chevron structure in the C1 alignment state. These four C1 alignment states are different from the known C1 alignment state. Further, two among the four C1 alignment states form bistable states (uniform alignment). Herein, two states among the four C1 states giving an apparent tilt angle $\theta_a$ therebetween in the absence of an electric field satisfying a relationship of $$\theta > \theta_a > \theta/2 \tag{2}$$

are inclusively referred to as a uniform state.

Figure 6B:
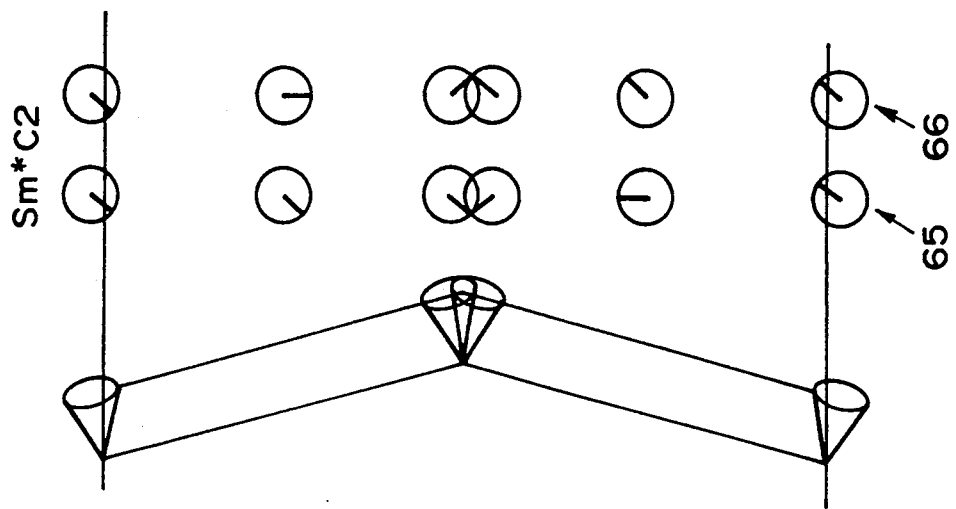
FIGS. 6A and 6B are explanatory views for illustrating changes in director orientation according to various positions between substrates in C1 alignment and C2 alignment, respectively.
Figure 6A:
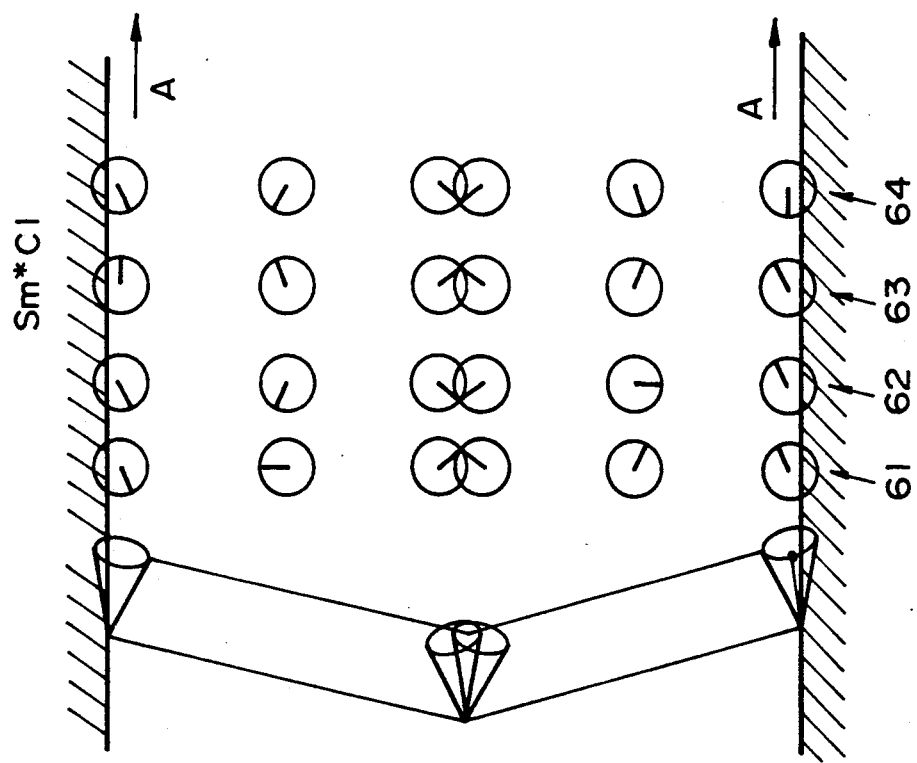

In the uniform state, the directors are believed to be not twisted between the substrates in view of optical properties thereof. FIG. 6A is a schematic view illustrating director positions between the substrates in the respective states in C1 alignment, More specifically, at 61-64 are respectively shown in changes in director positions between the substrates in the form of projections of directors onto cone bottoms as viewed from each bottom. At 61 and 62 is shown a splay state, and at 63 and 64 is shown a director arrangement which is believed to represent a uniform alignment state. As is understood from FIG. 6A, at 63 and 64 representing a uniform state, the molecule position (director) is different from that in the splay state either at the upper substrate or lower substrate. FIG. 6B shows two states in C2 alignment between which no switching is observed at the boundaries but an internal switching is observed.

The uniform state in C1 alignment provides a larger tilt angle $\theta_a$ and thus a higher contrast than the conventionally used bistable state in C2 alignment.

In an actual liquid crystal cell, the abovementioned liquid crystal molecular movement occur in such a manner that the liquid crystal molecules from the right the left in FIG. 4B when the liquid crystal molecules are entirely in the position 41. As a result, the cell thickness in the region 43 becomes larger with time to provide a certain color. In this state, adhesive particles 75 described hereinafter are considered to be stretched in the cell thickness direction.

When the liquid crystal molecules are in the dotted position 41a, they move in a reverse direction under application of an AC electric field. In any case, the liquid crystal movement occurs in a direction perpendicular to the rubbing direction, i.e., within a smectic layer.

In the present invention, however, a particulate adhesive is dispersed at a higher density in a region, where the cell thickness is liable be thicker due to the liquid crystal movement in view of the rubbing direction and average molecular axis direction of liquid crystal, than in the other region, whereby it has become possible to suppress the deformation of the particulate adhesive therein to minimize the increase in cell thickness.

Figure 7A:
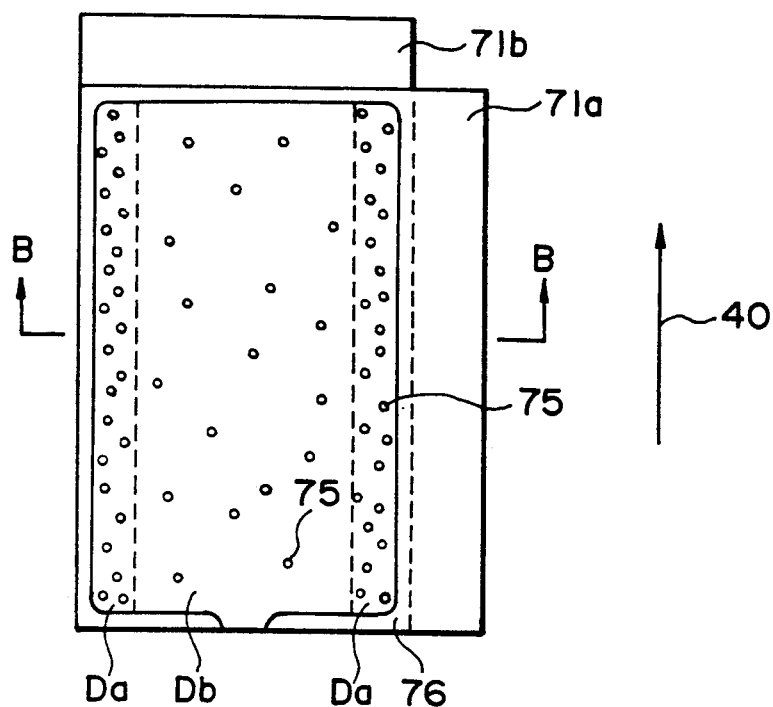
FIG. 7A is a plan view of a liquid crystal cell according to the present invention.
Figure 7B:
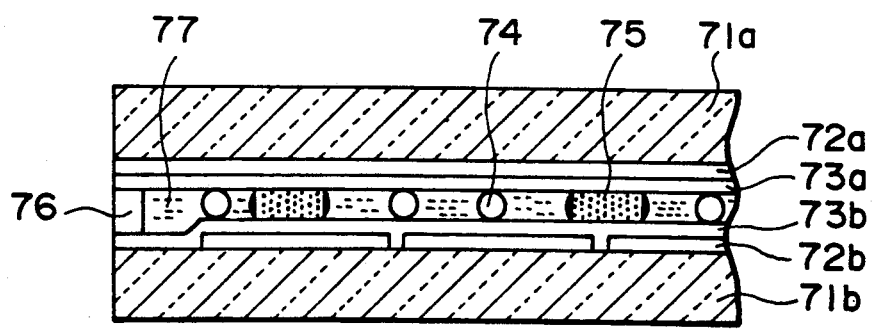
FIG. 7B is a sectional view taken along the line B—B in FIG. 7A.

FIG. 7A is a plan view of an embodiment of the liquid crystal device according to the present invention, and FIG. 7B is an enlarged partial sectional view taken along the line B—B in FIG. 7A. Referring to FIG. 7B, the liquid crystal device comprises an upper substrate 71a and a lower substrate 71b, which are disposed in parallel with each other and have thereon transparent electrodes 72a and 72b, respectively, in a thickness of, e.g., about 400-2000 Å and further thereon alignment control films 73a and 73b of, e.g., 10-1000 Å-thick films of an organic polymer, such as a polyimide. Between the alignment control films 73a and 73b is disposed an FLC 77, preferably an FLC having at least two stable states in a nonhelical structure.

In the present invention, at least one of the alignment control films 73a and 73b may be provided with a unidirectional alignment axis, preferably by rubbing. It is possible to further insert an insulating film of $SiO_2$, etc., in a thickness of, e.g., 100-2000 Å between the alignment control film 73a and transparent electrodes 72a and/or between the alignment control film 73b and transparent electrodes 72b.

The spacing between the substrates is held by, e.g., silica beads 74 having an average particle size of about 1.5 μm (generally 0.1-3.5 μm) dispersed in the FLC 77. In the FLC 77 is further disposed an epoxy-type particulate adhesive ("Torepearl" (trade name), mfd. by Toray K.K.) 75. The particulate adhesive originally had an average particle size of about 5 μm and assumed a shape of a relatively flat cylindrical pillar as shown in FIG. 7B in the FLC 77 due to a pressure applied to the substrates. The periphery of the substrates is sealed by an epoxy-type adhesive (sealant).

In the present invention, the particulate adhesive is dispersed not uniformly over the entire cell area but with a certain distribution.

FIG. 7A shows an example of such distribution.

In the embodiment shown in FIG. 7A, the rubbing direction is represented by a vertical arrow 40, so that the direction of liquid crystal movement is transverse, i.e., from right to left or left to right in FIG. 7A. Accordingly, the particulate adhesive 75 is dispersed at a higher density in region Da along the lateral ends or sides of the cell as shown in FIG. 7A. In order to vary the dispersion density over the cell area, uniform dispersion may be followed by further dispersion of the particulate adhesive through a hard mask having an opening pattern corresponding to an area of a higher dispersion density disposed above the substrate face.

On the other and, such a particulate adhesive is liable to function as nuclei of alignment defects in FLC alignment. Accordingly, the use of an excessive amount over the entire cell can result in a lower display quality. As a result, an average dispersion density of 10-200 pieces/mm$^2$ may be desired over an entire cell.

The average density of the particulate adhesive in the cell side region Da may suitably be 50-300 pieces/mm$^2$, the average density in a central region Db of the cell may suitably be 1-100 pieces/mm$^2$, and the average density in the central region Db may preferably be 30-60% of that in the side region Da.

In the present invention, the FLC may comprise a liquid crystal in a chiral smectic phase, more specifically, in chiral smectic C phase (SmC*), H phase (SmH*), I phase (SmI*), K phase (SmK*) or G phase (SmG*).

A particularly preferred class of FLC may include those showing cholesteric phase on a higher temperature side, which may for example include a pyrimidine-based mixture liquid crystal showing the following phase transition series and characteristic values.

$$\text{Cryst.} \xrightarrow{-3°\text{C.}} \text{SmC*} \underset{59°\text{C.}}{\overset{57°\text{C.}}{\rightleftarrows}} \text{SmA} \underset{80°\text{C.}}{\overset{79°\text{C.}}{\rightleftarrows}} \text{Ch.} \underset{85°\text{C.}}{\overset{85°\text{C.}}{\rightleftarrows}} \text{Iso.}$$

tile angle $\theta = 14$ degrees
layer inclination angle $\delta = 11$ degrees
apparent tilt angle $\theta_a = 11$ degrees.

In a specific embodiment, the above FLC was used in combination with rubbed polyimide alignment films to provide a pretilt angle $\alpha$ of 17 degrees, whereby the above-mentioned C1 uniform alignment state was realized in a cell by satisfying the conditions of the above-raised formulae (1) and (2).

More specifically, the cell having a structure roughly as shown in FIGS. 7A and 7B was prepared in the following manner. On one of a pair of substrates each having an effective area of 280 mm × 30 mm, a particulate adhesive having an average particle size of about 5 μm was dispersed at a density of about 110 pieces/mm$^2$ in about 20 mm-wide high-density stripe regions Da and at a density of 40 pieces/mm in the other region Db so as to provide an overall average density of about 50 pieces/mm$^2$. On the other hand, silica beads having an average diameter of about 1.5 μm were further dispersed at a uniform distribution rate of about 300 pieces/mm$^2$ on the substrate, to which the other substrate was superposed and fixed to form a blank cell. The blank cell was filled with the above-mentioned pyrimidine-based mixture liquid crystal at 85° C. and, after sealing, cooled to room temperature at a rate of 10° C./hour to form a liquid crystal cell according to the present invention. Then, the liquid crystal was uniformly oriented to assume an average molecular axis 41 as shown in FIG. 4A over the entire cell region and then supplied with rectangular AC pulses with a pulse width $\Delta t=25$ μs, a voltage amplitude Vpp=40 volts and a duty factor of ½ for 7 hours. Thereafter, the cell thickness in the region 43 in FIG. 4B was measured and found to have caused an increase of only about 10% compared with the original value.

Figure 8:
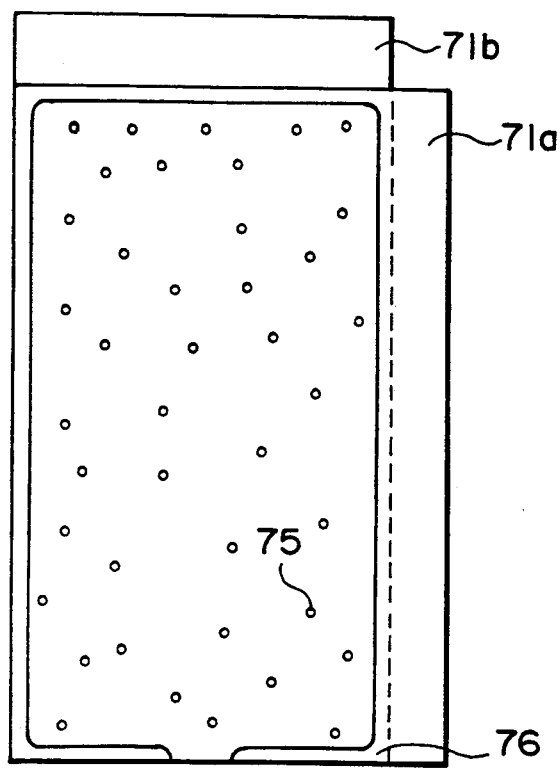
FIG. 8 is a plan view of a liquid crystal cell outside the present invention.

For the purpose of comparison, a liquid crystal cell was prepared in quite the same manner as above except that the particulate adhesive was dispersed at a uniform distribution rate of about 50 pieces/mm$^2$ over the entire cell area as shown in FIG. 8 (in which the same reference numerals are used to denote similar members as in FIG. 7). As a result, the increase in cell thickness in the region 43 in FIG. 4B was measured to show an increase of about 30% compared with the original value.

As a more generalized description, the width of the high-density stripe region Da in FIG. 7A may suitably be in the range of 5.75 mm to 46 mm for the effective display area of 280 mm×230 mm. In other words, the high-density region Da may suitably have a width which is at most 1/10, preferably 1/50 to 1/20 of the width of the central region Db.

In a still-different expression, the high-density areas Da may suitably have an area $S_D$ which satisfies $0.05<S_D/S<0.4$, preferably $0.1<S_D/S<0.3$ with respect to the total effective display area S of the cell.

The ratio of $P_D$ (density of the particulate adhesive in the high-density region Da)/P (density in the central region Db) may suitably satisfy $1.5<P_D/P<5$, preferably $2 \leq P_D/P<3$.

Figure 9:
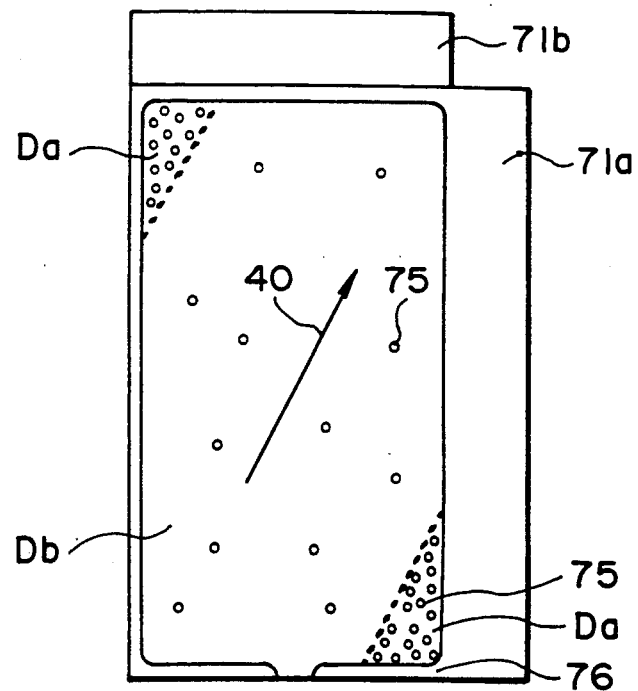
FIG. 9 is a plan view of another embodiment of the liquid crystal cell according to the present invention.

The high-density regions Da may suitably be disposed at remote ends in a direction perpendicular to the rubbing or unidirectional alignment axis, i.e., in a direction perpendicular to the normal to smectic layers, and may be disposed as shown in FIG. 9 (wherein the same reference numerals are used to denote similar members as in FIG. 7) when the rubbing direction 40 is oblique as shown with respect to the longitudinal direction of the cell.

The particulate adhesive used in the present invention may preferably have an average particle size of 3 μm–30 μm. The spacer particles, such as silica beads, determining the spacing between the pair of substrates 71a and 71b may generally have an average particle size of 0.5 μm–5 μm, and may suitable be dispersed in the cell at a uniform dispersion rate of generally 50–500 pieces/mm$^2$, preferably 100–400 pieces/mm$^2$.

In the present invention, it is also possible to provide unidirectional alignment axes intersecting with each other at an intersection angle of 3–10 degrees to the pair of substrates respectively. In such a case, the ambient axis for determining the high-density dispersion region may be taken as a line dividing the intersection angle into equal halves.

As described above, according to the present invention, it is possible to realize a large-area liquid crystal, particularly one with a high contrast alignment by using FLC, while preventing a local change in cell thickness during the drive, by locally increasing the distribution density of a particulate adhesive which has been used in a liquid crystal cell so as to increase the durability of the cell in response to an external stress.

What is claimed is:

1. A liquid crystal cell, comprising: a pair of substrates each having an electrode thereon and disposed with their faces having the electrode opposite to each other, a spacer and a particulate adhesive disposed to leave a spacing between the substrates, and a liquid crystal disposed to fill the spacing between the substrates, wherein the particulate adhesive is dispersed at a higher density in a region close to a side of the cell than in a central region of the cell.

2. A cell according to claim 1, wherein the substrates are provided with unidirectional alignment axes which are parallel and in the same direction, and said particulate adhesive is dispersed at a higher density on the side of the cell than the central region of the cell in a direction perpendicular to the unidirectional alignment axes.

3. A cell according to claim 1, wherein said liquid crystal is a ferroelectric liquid crystal.

4. A cell according to claim 3, wherein said ferroelectric liquid crystal is placed in an alignment state satisfying $\theta<\alpha+\delta$, wherein $\alpha$ denotes a pretilt angle, $\theta$ denotes a tilt angle and $\delta$ denotes an angle of inclination of SmC* layer, and shows at least two stable states providing optical axes forming an angle $2\theta a$ therebetween satisfying $\theta>\theta a>\theta/2$.

5. A cell according to claim 1, wherein the particulate adhesive is dispersed at a density on the side of the cell which is at least two times that in the central region of the cell.

6. A cell according to claim 1, wherein the substrates are provided with unidirectional alignment axes intersecting each other at an intersection angle of 3–10 degrees, and said particulate adhesive is dispersed at a higher density on the side of the cell than in the central region in a direction perpendicular to a line which divides the intersection angle into equal halves.

* * * * *

UNITED STATES PATENT AND TRADEMARK OFFICE
CERTIFICATE OF CORRECTION

PATENT NO. : 5,204,766
DATED : April 20, 1993
INVENTOR(S) : OSAMU TANIGUCHI, ET AL.

Page 1 of 2

It is certified that error appears in the above-identified patent and that said Letters Patent is hereby corrected as shown below:

COLUMN 3

Line 20, "1" should be deleted.
Line 40, "-θ0" should read -- -θ-- and "Their" should read --their--.
Line 44, "in" should read --is--.
Line 61, "region 42" should read --region 43--.
Line 63, "abovementioned" should read --above-mentioned--.

COLUMN 4

Line 59, "in" should be deleted. (1st occurrence)

COLUMN 5

Line 6, "abovementioned" should read --above-mentioned--.
Line 7, "occur" should read --occurs--.
Line 23, "be" should read --to be--.

COLUMN 6

Line 10, "and," should read --hand,--.
Line 39, "tile" should read --tilt--.
Line 51, "280 mm x 30 mm" should read --280 mm x 230 mm--.
Line 55, "40 pieces/mm" should read --40 pieces/mm$^2$--.

UNITED STATES PATENT AND TRADEMARK OFFICE
CERTIFICATE OF CORRECTION

PATENT NO. : 5,204,766
DATED      : April 20, 1993
INVENTOR(S): OSAMU TANIGUCHI, ET AL.

It is certified that error appears in the above-identified patent and that said Letters Patent is hereby corrected as shown below:

<u>COLUMN 7</u>

Line 45, "suitable" should read --suitably--.

Signed and Sealed this

First Day of November, 1994

Attest:

BRUCE LEHMAN

*Attesting Officer*  *Commissioner of Patents and Trademarks*